United States Patent [19]

Shelly

[11] Patent Number: 4,629,714

[45] Date of Patent: * Dec. 16, 1986

[54] INTERMETALLIC COMPOUNDS AND CATALYTIC USE THEREOF

[75] Inventor: Javan Shelly, Reading, Ohio

[73] Assignee: National Distillers and Chemical Corporation, New York, N.Y.

[ * ] Notice: The portion of the term of this patent subsequent to Apr. 23, 2002 has been disclaimed.

[21] Appl. No.: 791,495

[22] Filed: Oct. 25, 1985

[51] Int. Cl.$^4$ .......................... C08F 4/62; C08F 4/64; C08F 4/68

[52] U.S. Cl. ................................. 502/113; 502/114; 502/115; 502/117; 502/118; 502/119; 502/129; 502/132; 502/133; 502/134; 502/171; 526/123; 526/124; 526/125; 526/127; 526/128; 526/132; 526/133

[58] Field of Search .............. 502/104, 111, 113, 115, 502/117, 119, 129, 132, 134, 114, 133, 171, 118

[56] References Cited

U.S. PATENT DOCUMENTS 4,513,095  4/1985  Speca .............................. 502/113 X
4,536,487  8/1985  Speca .............................. 502/113 X
4,540,680  9/1985  Speca .............................. 502/113 X

*Primary Examiner*—Patrick P. Garvin
*Attorney, Agent, or Firm*—Kenneth D. Tremain

[57] ABSTRACT

An intermetallic compound is disclosed. The compound is formed by reacting a first reaction product, the first reaction product being the product of reaction of a polymeric transition metal oxide alkoxide with a reducing metal having a higher oxidation potential than the transition metal, the polymeric transition metal oxide alkoxide being the product of the controlled partial hydrolysis of a transition metal alkoxide, with a first halide activator to produce a second reaction product. The second reaction product, in turn, is reacted with a second halide activator to form the intermetallic compound. The intermetallic compound is useful as a catalyst component in a catalyst system for the polymerization of alpha-olefins. The catalyst system includes, in addition to the intermetallic compound, a cocatalyst, an organic compound which includes an element selected from the group consisting of aluminum and boron.

21 Claims, No Drawings

INTERMETALLIC COMPOUNDS AND CATALYTIC USE THEREOF

BACKGROUND OF THE DISCLOSURE

1. Field of the Invention

The present invention is directed to intermetallic compounds of transition metal oxide alkoxides. More particularly, the instant invention is directed to intermetallic compounds useful as catalyst components in the polymerization of alpha-olefins.

2. Background of the Prior Art

It has been recently discovered that an important class of intermetallic compounds can be utilized as catalyst components in the polymerization of alpha-olefins, particularly ethylene, to produce a linear low density polyethylene resin.

Specifically, U.S. Pat. No. 4,513,095, assigned to the assignee of the present application, provides a linear low density polyethylene resin (LLDPE) in a low pressure polymerization process in which the LLDPE has a narrow molecular weight distribution, improved strength properties, high melt viscosity, high softening point, improved environmental stress crack resistance and improved low temperature brittleness. These properties manifest themselves in improved blown films, wire and cable coatings, cast films, coextrusions, and injection and rotational molding applications.

The intermetallic compound of the '095 patent is formed by the reaction of a transition metal oxide alkoxide with at least one reducing metal, i.e., a metal having a higher oxidation potential than the transition metal. In a preferred embodiment of this patent, polymeric titanium alkoxide, or oxoalkoxide, is reacted with magnesium metal to provide a reaction product which is activated to form the olefin polymerization catalyst element. In a still more preferred embodiment of the invention set forth in the '095 patent, titanium tetrabutoxide is reacted with magnesium metal in a hydrocarbon solvent and in the presence of a controlled source of water, preferably a hydrated metal salt such as magnesium halide hexahydrate.

Although the intermetallic compound of U.S. Pat. No. 4,513,095 utilized as a catalyst component with an organometallic compound, preferably, an aluminum alkyl, more preferably, trialkyl aluminum and most preferably, triethyl aluminum, produces improved linear low density polyethylene resins having narrow molecular weight distribution, improved strength properties, higher melt viscosity, higher softening point, improved environmental stress crack resistance and improved low temperature brittleness and even though excellent catalyst efficiency is obtained using this catalyst still further improvements in catalyst efficiency are always desirable. As those skilled in the art are aware, increased catalyst efficiency decreases an important expense in the process of forming the polyethylene resin, the cost of catalyst. In addition, increased catalyst efficiency decreases the cost of separating the catalyst from the product since less catalyst is required to produce the same quantity of polymer. Finally, the polymeric product properties are enhanced because, with the presence of a lower concentration of catalyst in the polymerization reaction mixture, the level of catalyst impurity remaining in the final resin product is correspondingly decreased. As such, decreased level of catalytic impurity increases product properties which, as those skilled in the art are aware, are adversely affected in proportion to the degree of catalyst concentration in the polymer.

BRIEF SUMMARY OF THE INVENTION

The present invention is directed to an intermetallic compound which, when combined with a cocatalyst compound, provides a catalyst system for the polymerization of alpha-olefin resins which have improved properties over those obtained by the catalytic polymerization of alphaolefins using the intermetallic compound of U.S. Pat. No. 4,513,095 because of the significant improvement in catalyst efficiency obtained therewith. Thus, the polymerization process involving the use of the intermetallic compound of this invention as a catalytic component results in a process producing a significantly increased quantity of polymeric product for the same quantity of intermetallic compound catalyst compared to the catalyst components of the prior art. Thus, the concentration of catalyst in the polymeric product is significantly reduced compared to that found in polymers polymerized utilizing the closest related catalyst of the prior art.

In accordance with the present invention an intermetallic compound is provided which comprises the reaction product of a first reaction product of a polymeric transition metal oxide alkoxide and a reducing metal having a higher oxidation potential than said transition metal, said polymeric transition metal oxide alkoxide being the product of a controlled partial hydrolysis of a transition metal alkoxide with a first halide activator selected from the group consisting of an alkyl aluminum halide, a silicon halide, an alkyl silicon halide, a titanium halide, a boron halide and an alkyl boron halide whereby a second reaction product is formed which is reacted with a second halide activator selected from the group consisting of an alkyl aluminum halide, a silicon halide, an alkyl silicon halide, a titanium halide, a boron halide and an alkyl boron halide.

DETAILED DESCRIPTION

A detailed exposition on transition metal alkoxides, particularly titanium alkoxides, is provided in U.S. Pat. No. 4,513,095. This description need not be completely duplicated in that U.S. Pat. No. 4,513,095 is incorporated herein by reference.

As in U.S. Pat. No. 4,513,095, the polymeric oxide alkoxide of the transition metal of the present invention is partially hydrolyzed. As stated in the '095 patent, a preferred embodiment of the hydrolysis reaction occurs in situ. This in-situ reaction is accomplished by continuous introduction of water to the hydrolysis reaction. In a preferred embodiment of the '095 patent the water needed in the hydrolysis reaction is continuously provided by a water providing agent selected from the group consisting of an aquo complex and a hydrated metal salt. An obvious requirement is that the salt or the complex used not have a deleterious effect on the reaction system. Suffice it to say, the water in the aquo complex or hydrated salt is released in such a way as to advantageously control this partial hydrolysis reaction.

The hydrolysis reaction precedes under ambient pressure and temperature and requires no special reaction controls. A hydrocarbon solvent may be used but is not essential. Mere contact of the materials for a period of time, usually 10 to 30 minutes but up to about 2 hours, is sufficient.

The polymeric transition metal oxide alkoxide is reacted with a reducing metal having an oxidation potential higher than the transition metal of the alkoxide. Preferably, the reducing metal is selected from the group consisting of magnesium, calcium, potassium, aluminum and zinc. It is particularly preferred that the reducing metal be magnesium. The reducing metal of the present invention is supplied, at least in part, in the zero oxidation state. A convenient source of reducing metal is metal turnings, metal ribbon or metal powder.

As stated above, the transition metal compound is a transition metal alkoxide. It is emphasized that for the purposes of this invention a transition metal alkoxide is defined as a compound that includes at least one alkoxide substituent with the proviso that the non-alkoxide substituents not interfere with the catalytic effect provided by the alkoxide substituent or substituents. It is preferred, however, that the transition metal alkoxide include only alkoxide substituents.

Whether the transition metal has substituents other than alkoxides or not, it is preferred that the alkoxy groups contain up to 10 carbon atoms. More preferably, the alkoxy radicals preferable for use in the transition metal oxide of the present invention are selected from the group consisting of ethoxy, n-propoxy, isopropoxy, n-butoxy, isobutoxy, sec-butoxy, tert-butoxy, n-pentoxy, tert-amyloxy, n-hexyloxy, n-heptyloxy and nonyloxy. Of these, n-butoxy is particularly preferred.

The transition metal of the transition metal alkoxide is a metallic element of Group IVB or VB of the Periodic Table of the Elements whose penultimate electron shell is electron deficient. More preferably, the transition metal is titanium or zirconium. Most preferably, the transition metal is titanium.

Although a single transition metal alkoxide is contemplated, it is possible to use more than one transition metal alkoxide. When more than one transition metal alkoxide is used, a mixture of two or more transition metal alkoxides are utilized. Whether a single alkoxide or a mixture of at least two alkoxides are employed, it is preferred that the alkoxide be liquid under ambient conditions and soluble in hydrocarbon solvents.

Whether the polymeric transition metal oxide alkoxide is in-situ or independently prepared, the source of water is provided in a rate controlled manner during the reaction. As aforesaid, hydrated metal salts and aquo complexes have been found to be excellent means for providing this source of water. It is noted that aquo complexes provides a controlled quantity of water and thus are as suitable for this function as are hydrated metal salts. In aquo complexes water is loosely bound as in a coordination sphere about a metal salt, by hydrogen, lattice or limited electrovalent forces. For example, silica gel containing controlled amounts of bound water may be employed. Among the hydrated metal salts the halides, nitrates, sulfates, carbonates and carboxylates of sodium, potassium, calcium, aluminum, nickel, cobalt, chromium, magnesium and the like are preferred.

The interaction of these components is conveniently carried out in an enclosed reactor, preferably coupled with reflux capacity for volatile components at the elevated temperatures produced in the reaction vessel. Autogenous pressure is employed, as the reaction proceeds smoothly under ambient conditions, with heating to initiate and maintain the reaction. Reaction stirring is preferred to avoid caking or coating of vessel surfaces and to provide intimate admixture of components, thus insuring a homogeneous reaction system.

A hydrocarbon solvent such as hexane, heptane, octane, decalin, mineral spirits and the like is usually employed to facilitate intermixture of components, good heat transfer and maintenance of a homogeneous reaction system. Saturated hydrocarbons having a boiling point in the range of between 60° and 190° C. are preferred. The liquid transition metal component may also serve at least in part as the reaction medium. As those skilled in the art are aware, volatile components of the reactants form azeotropes with such solvents. For example, butanol, generated when the titanium component is titanium tetra n-butoxide, forms an azeotrope with hydrocarbon solvents. Thus, selection of the solvent and/or alkoxide must be selected with due consideration of the possibility of decreased reaction temperature caused by the formation of an azeotrope.

The temperature of reaction of the transition metal component, the reducing metal and the metal salt hydrate, when utilized, must be at least 50° C. The maximum temperature of the reaction is usually about 190° C. Although higher temperatures may be utilized no advantage is obtained thereby. Obviously, in the absence of a solvent, the upper limit of reaction is the reflux temperature of the alkanol generated from the transition metal alkoxide. Although the reaction usually occurs at a temperature range of between 50° and 190° C., a more preferred temperature is between 70° and 140° C. The duration of reaction may be quite variable, as short as 30 minutes or as long as 4 hours or more. The reaction is completed upon consumption of the reducing metal which is visible.

Molar ratios of the components may vary within certain ranges without significantly affecting the performance of the catalyst precursor in ultimate use. To avoid competing reactions rendering the reaction product inconveniently gelatinous or intractable, the transition metal component is ordinarily supplied in at least molar proportion relative to the reducing metal. However, the ratio of transition metal to reducing metal may broadly range from between about 0.5:1.0 to 3.0:1.0. More preferably, this ratio is in the range of from about 1:0.1 to 1:1. An insufficient level of reducing metal results in suppression of the reaction temperature such that the reflux temperature of the pure solvent remains unattained. On the other hand, an excess of reducing metal obviously results in some of the metal being unconsumed.

The water or water-related species is generally supplied in relation to the transition metal component such that about 0.66 to 3 moles of water are supplied per mole of transition metal. More preferably, 1 to 2 moles of water per mole of transition metal provides the greatest degree of homogeneity and ease of reaction. Most preferably, a modest excess of water over molar balance with the transition metal component, about 10 to 40%, insures complete reaction.

As mentioned earlier, the water of reaction must be provided in a regular, sequenced manner. Thus, the use of a hydrate is preferred. This is so because it is easily activated, released and made accessible in a sequenced manner. It is emphasized that supplying the same molar proportion of free water at the commencement of the reaction is wholly ineffective in initiating reaction. Rather such supply results in undesirable complete hydrolysis reactions.

In the preferred embodiment wherein water is supplied as a hydrated metal salt, the salt may be occluded in the resulting reaction product. The identity of the hydrated metal salt or aquo complex is essentially a matter of practicality in that the primary purpose of this reactant is the controlled availability of water. However, among aquo complexes and hydrated metal salts sodium acetate trihydrate, magnesium chloride hexahydrate, magnesium acetate tetrahydrate, magnesium sulfate heptahydrate, magnesium silicon fluoride hexahydrate, magnesium acetylacetonate dihydrate, aluminum chloride hexahydrate, calcium chloride dihydrate, chromium chloride hexahydrate, cobalt chloride hexahydrate, nickel chloride hexahydrate, ferric chloride hexahydrate and magnesium bromide hexahydrate are preferred. Of these, magnesium chloride hexahydrate is particularly preferred. Most important, it is emphasized that anhydrous grade salts cannot be utilized as reactants in the present invention.

It is emphasized, in conjunction with the use of hydrated metal salts or aquo complexes, that the earlier discussion of molar ratio of water to transition metal must take into consideration stoichiometric factors. Thus, the number of moles of the aquo complex or hydrated metal salt reacted is a function of the number of moles of water hydrated onto the salt. For example, in the preferred case where magnesium chloride hexahydrate is employed, since six moles of water are provided in one mole of magnesium chloride hexahydrate only 0.17 mole of the hexahydrate is required to provide an equimolar amount of water and transition metal.

The reaction product formed by the transition metal alkoxide, the reducing metal and the hydrate, for clarity, the first reaction product, is reacted with a first halide activator. The first halide activator is preferably selected from the group consisting of alkyl aluminum halides, silicon halides, titanium halides, boron halides and alkyl boron halides. More preferably, the first halide activator of the present invention is the chloride of the above mentioned class of compounds. That is, more preferably, the first halide activator is selected from the group consisting of alkyl aluminum chlorides, silicon chlorides, boron chlorides and alkyl boron chlorides. Still more preferably, the first halide activator is selected from the group consisting of silicon tetrachloride and titanium tetrachloride. Most preferably, the first halide activator is silicon tetrachloride.

The reaction of the first halide activator with the first reaction product is vigorously exothermic. Thus, it is preferred that the first halide activator be added gradually to the reaction system. The temperature of reaction is in the range of between about 0° C. and 100° C. Because of the highly exothermic nature of this reaction the reactants initially are contacted at the low end of this range, preferably at about 0° C. Later, the reaction temperature is raised to the reflux temperature, the boiling point of the solvent for the first halide activator as well as for the liquid constituent of the slurry which contains the reaction mixture. For example, the reaction may occur at 0° C., in the presence of an ice bath for about 30 minutes. For the next 30 minutes the temperature may be allowed to rise gradually by removal of the ice bath. Finally, the reaction may occur at reflux for 1 hour. As stated earlier, it is preferred that the first halide activator solvent and reaction product slurrying agent be hydrocarbons. In a more preferred embodiment, the solvent and slurrying agent are identical to guard against azeotropic formation.

The halide activator is supplied to this reaction at a molar ratio of halide activator metal to transition metal in the range of between about 2:1 and 6:1. More preferably this molar ratio is in the range of between about 3:1 and 6:1.

It is preferred that the product of the first halide activator and first reaction product be decanted and washed several times with a hydrocarbon solvent. Thereafter, just as in the case of the reaction between the first reaction product and the first halide activator, the reaction product of this reaction, denoted the second reaction product, is slurried in a slurrying agent which is preferably a hydrocarbon solvent. To this is added a second halide activator, which, as in the case of the first halide activator, is preferably dissolved in a hydrocarbon solvent identical to the slurrying agent in which is disposed the solid, second reaction product with which it reacts. The second halide activator reacts with the second reaction product in the same manner as the reaction which results in the formation of the second reaction product.

The second halide activator is preferably selected from the group consisting of alkyl aluminum halides, silicon halides, alkyl silicon halides, titanium halides, boron halides and alkyl boron halides. More preferably, the second halide activator is selected from the group consisting of alkyl aluminum chlorides, silicon chlorides, alkyl silicon chlorides, titanium chlorides, boron chlorides and alkyl boron chlorides. Still more preferably, the second halide activator is selected from the group consisting of silicon tetrachloride and titanium tetrachloride. Most preferably, the second halide activator is titanium tetrachloride.

In this second activation reaction, to produce a third reaction product, the intermetallic compound of the present invention, the second halide activator is supplied to the reaction at the same molar ratio as the first halide activator. That is, the molar ratio of second halide activator metal to transition metal of the first reaction product is within the range of between about 2:1 and 6:1, more preferably, in the range of between about 3:1 and 6:1. Unlike the first activation reaction, the second activation reaction occurs at elevated temperature. Thus, the temperature of reaction between the second reaction product and the second halide activator is in the range of between about 25° C. and 150° C. More preferably, the temperature of this reaction is in the range of between about 50° C. and 100° C. In a preferred embodiment, the reaction occurs at the reflux temperature of the common hydrocarbon solvent and slurrying agent. The time of reaction between the second reaction product and second halide activator ranges from a period of approximately of one-half to three hours at the reflux temperature of the common solvent and slurrying agent. More preferably, the time of the reaction to produce the third reaction product is in the range of 1 to 2 hours.

As in the case of the second reaction product, the third reaction product is decanted and washed several times with a hydrocarbon solvent. These hydrocarbon washes are suggested for incremental improvement in performance when the intermetallic compound is employed as a catalyst component, to be discussed below, due to minimization of reactor fouling and improved polymer morphology. This is because the hydrocarbon washes are theorized to reduce resin halide concentration.

The product of the second activation step is the intermetallic compound of the present invention. The present invention includes the utilization of the intermetallic compound as a component in a catalyst system for the polymerization of alpha-olefins. In addition to the organometallic compound, formed in accordance with the above procedure, the catalyst system includes a cocatalyst. The cocatalyst of the present invention comprises an organic compound which includes aluminum or boron. Preferably, the organic compound is alkyl boron or alkyl aluminum. More preferably, the compound is a trialkyl boron or a trialkyl aluminum compound. Of the two, a trialkyl aluminum compound is preferred. Trialkyl aluminums within the contemplation of this invention include triethyl aluminum, triisobutyl aluminum and tri-n-octyl aluminum. In the alternate preferred embodiment wherein a boron containing compound is employed, the boron alkyls preferable for use in this invention include triethyl borane, triisobutyl borane and trimethyl borane. Less preferably, other boron or aluminum containing compounds may be utilized as cocatalyst. For example, alkyl aluminum halides, alkyl aluminum alkoxides and higher boron hydrides such as diborane, pentaborane, hexaborane and decaborane may be utilized.

The organometallic compound of the present invention and the cocatalyst, comprising the catalyst system of the instant invention, are utilized in the catalytic polymerization of alpha-olefins. In a preferred embodiment the catalytic system is introduced, along with the reactants, into a loop reactor adapted for slurry operation wherein alpha-olefins are polymerized. The solvent employed in the slurry polymerization is preferably a hydrocarbon such as isobutane. The solvent dissolves the reactants but upon polymer formation the polymer separates as a granular solid thus forming the slurry. Polymerization reactions employing the catalyst system of the present invention are quite flexible. They may be conducted at low pressure, e.g., 200-1000 psi. and a temperature in the range of between about 100° and 200° F. If desired, hydrogen gas may be employed to control molecular weight distribution. Alternatively, the catalyst of the present invention may be utilized in a high pressure polymerization reaction, e.g., 20,000 to 40,000 psi, in an autoclave, tubular reactor or other high pressure reaction vessel.

As stated earlier, the preferred alpha-olefin polymerized in a polymerization reaction utilizing an intermetallic compound of the present invention as a catalyst component is ethylene. Thus, the homopolymerization of ethylene, to produce polyethylene, using the intermetallic compound of the present invention as catalyst is a preferred embodiment of the present invention. Other equally preferred embodiments utilizing the catalyst system of the present invention are the copolymerization of ethylene with minor amounts of other alpha-olefins. The amount of alpha-olefins added to ethylene may vary over a wide range. However, an amount of 3 to 10 mole percent of alpha-olefins other than ethylene is preferred. For example, the copolymerization of ethylene and butene-1, ethylene-hexene-1, ethylene-octene-1, ethylene-4-methylpentene-1, ethylene-3-methylbutene-1, ethylene-1-heptene, ethylene-1-decene, ethylene-1-dodecene are copolymers contemplated for catalytic polymerization using the organometallic compound of the present invention. In addition, the terpolymerization of ethylene with two of the above recited compounds are also contemplated for use in this invention.

In the copolymerization of ethylene copolymers it is preferred that the copolymers formed have a density within the range of between 0.91 and 0.96.

The following examples are given to illustrate the scope and spirit of the instant invention. Because these examples are given for illustrative purposes only, the present invention should not be limited thereto.

EXAMPLE 1

Preparation of the Intermetallic Compound

Eighty grams of titanium tetrabutylate, 4.3 grams of magnesium turnings, 6.1 grams of magnesium chloride hexahydrate and 120 ml octane were disposed in a 500 ml, nitrogen-purged, three-necked flask equipped with thermometer, condenser and mechanical stirrer. The mixture was stirred and heated for 4 hours producing a slurry of dark blue liquid and green solid which refluxed at 120° C. After 4 hours, the slurry was cooled to room temperature and a 24.4 gram aliquot of the slurry containing about 0.0336 gram-atom of titanium, calculated from the known percentage of titanium in the slurry, was diluted with 100 ml heptane and charged into another 500 ml, nitrogen-purged, three-neck flask equipped with an addition funnel, condenser and mechanical stirrer. The mixture was stirred and cooled with an ice bath surrounding the flask. To this cooled and stirred slurry was added, dropwise, a solution of 11.5 ml of silicon tetrachloride in 15 ml heptane. Upon completion of this addition, the mixture was stirred for 30 minutes at 0° C. At this point the ice bath was removed and stirring continued for 30 minutes without heating or cooling. Thereafter, the mixture was heated for 1 hour at reflux temperature.

After reflux heating for 1 hour, the mixture was allowed to cool to room temperature. The supernatant was decanted and the remaining solid was washed twice. In each case the wash comprised 75 ml of heptane. The washed solid, the second reaction product, was reslurried in 150 ml. of heptane to which a solution of 11 ml. of titanium tetrachloride in 25 ml heptane was added. This addition occurred with stirring. Upon completion of this addition, the mixture was heated at reflux temperature for 1 hour to produce a rust-brown solid. The thus formed third reaction product was cooled to room temperature, the supernatant decanted and the solid was washed 5 times. In each case the washing comprised 75 to 100 ml. of heptane. After washing, the solid was subjected to very low pressure to evaporate any remaining solvent. The final product was 4.9 grams of intermetallic compound.

COMPARATIVE EXAMPLE 1

Preparation of an Intermetallic Compound of the Prior Art

The same quantities of titanium tetrabutylate, magnesium turnings, magnesium chloride hexahydrate and octane employed in Example 1 were provided in an identical 500 ml. flask to the three-necked flasked utilized in the production of the first reaction product of Example 1. The mixture was stirred and heated at reflux for 3½ hours to produce a slurry of dark blue liquid and green solid. The slurry was cooled to room temperature and 25.4 grams of the slurry containing about 0.035 gram-atom of titanium was diluted with 50 ml. of octane and added to a 250 ml. nitrogen-purged, three-necked flask equipped with an addition funnel, condenser and magnetic stirrer. As in Example 1, the mixture was stirred and cooled in an ice bath and to which a solution of 12 ml. of silicon tetrachloride in 15 ml. octane was added dropwise. The reactants were stirred for 2 hours at 0° C. The product of this reaction was a dark violet solid. The mixture was stirred an additional 3 hours with the ice bath removed. The supernatant was then decanted, the solid washed 5 times, in each case with 50 ml octane. The thus washed solid product was freed of any residual solvent which was removed by evaporation by subjecting the solids to very low pressure. The result, an intermetallic compound of the prior art, a violet solid, was produced in a quantity of 6.7 grams.

EXAMPLES 2-4

Copolymerization of Ethylene-Butene-1

A catalyst system comprising a hydrocarbon suspension of 2 to 3 milligrams of a catalyst, the intermetallic compound made in accordance with Example 1, and a cocatalyst, 1 cc of a 25 weight percent solution of triethyl aluminum in heptane, were added to 1200 cc. isobutane in a 1-gallon reactor previously purged with nitrogen. A premeasured amount of liquid butene-1 was also added to the reactor. With the catalyst, cocatalyst, butene-1 and isobutene in the reaction, the reactor was heated to a temperature of 170° F. With the temperature at 170° F. gaseous hydrogen and ethylene were added to the reactor. A specified quantity of hydrogen was added initially, the amount added measured by the partial pressure of the hydrogen. The ethylene added was the amount necessary to bring the total pressure to the predesired level.

Polymerization was carried out for 1 hour with butene-1 pumped into the reactor, to supplement the preload quantity of butene-1, at a rate of 7.6 cc per minute. Ethylene gas was added as necessary to maintain the total pressure.

Three experiments, Examples 2-4, were conducted using the catalyst system defined above. In each experiment the amounts of reactants employed was varied. In each example the amounts of hydrogen utilized, the total pressure in the reactor, the preload quantity of butene-1, the time duration of the run as well as the total weight of ethylene-butene-1 copolymer produced in the polymerization reaction was recorded. The product, the copolymer of ethylene and butene-1, was, in addition to being weighed, analyzed to determine its density and melt index. The results of these analysis were recorded.

Based on this data, Table 1 was prepared. In Table 1, the quantity of hydrogen recorded is directly reported in pressure terms. So, too, is total pressure. The total quantity of butene-1 is reported as recorded, in volume terms. Catalyst efficiency per unit time is reported. The catalyst efficiency was calculated by dividing the weight of product obtained by the weight of catalyst, the intermetallic compound of the present invention. The catalyst efficiency is divided by the time duration of the polymerization experiment to obtain the catalyst efficiency per unit time. Finally, analysis of the copolymer product, in terms of its density and melt index, was conducted upon completion of Examples 2-4 and is reported also in Table 1.

COMPARATIVE EXAMPLES 2-4

Copolymerization of Ethylene-Butene-1 Using Prior Art Catalyst

The procedure of Examples 2-4 was repeated. However, instead of 2 to 3 mg of the intermetallic compounds formed in accordance with Example 1, this component of the catalyst system was provided by the intermetallic compound made in accordance with Comparative Example 1. In all other respects Examples 2-4 were repeated. The exact amounts of the reactants are set forth in Table 1. Similarly, the catalyst activity per unit time, defined in Examples 2-4, is reported as is the copolymer density and melt index. All reported information with regard to Comparative Examples 2-4 is included in Table 1.

TABLE 1

| Example No. | 2 | 3 | 4 | CE1 | CE2 | CE3 |
|---|---|---|---|---|---|---|
| Polymerization Conditions | | | | | | |
| H$_2$, psi | 30 | 29 | 29 | 36 | 38 | 37 |
| Total Pressure, psi | 333 | 332 | 332 | 338 | 339 | 338 |
| Ethylene, psi | 123 | 123 | 123 | 122 | 121 | 121 |
| Butene Preload, cc | 266 | 418 | 418 | 266 | 418 | 418 |
| Product Characteristics | | | | | | |
| Density, g/cc | 0.9102 | 0.9080 | 0.9065 | 0.9185 | 0.9138 | 0.9138 |
| Melt index[1], g/10 min. | 1.39 | 1.51 | 1.85 | 1.79 | 1.75 | 1.64 |
| Catalyst Efficiency | | | | | | |
| Cat. Activity, g Poly/g Cat/hr. | 285,000 | 258,000 | 249,000 | 79,000 | 67,700 | 64,000 |

Note
[1]Measured in accordance with ASTM Test No. 1238, Condition E.

DISCUSSION OF RESULTS

The results of the experimental data, summarized in Table 1 above, establish the dramatic increase in catalytic activity provided by the intermetallic compound of the present invention compared to the catalytic activity of the closest related intermetallic compound of the prior art. When the intermetallic compound of the present invention is used as a catalyst in the polymerization of alpha-olefins, greater than a three-fold increase in catalytic activity was noted.

The above preferred embodiments and examples are given to illustrate the scope and spirit of the present invention. These embodiments and examples will make apparent, to those skilled in the art, other embodiments and examples. These other embodiments and examples are within the contemplation of the present invention. Therefore, this invention should be limited only by the appended claims.

What is claimed is:

1. An intermetallic compound comprising the product of the sequential reaction of product (A), compound (B) and compound (C) wherein:
   (A) is the product of reaction between a polymeric transition metal oxide alkoxide and a reducing metal having a higher oxidation potential than said transition metal, said polymeric transition metal oxide alkoxide being the product of the controlled partial hydrolysis of a transition metal alkoxide;
   (B) is a first halide activator selected from the group consisting of an alkyl aluminum halide, a silicon halide, an alkyl silicon halide, a titanium halide, a boron halide and an alkyl boron halide;

(C) is a second halide activator selected from the group consisting of an alkyl aluminum halide, a silicon halide, and alkyl silicon halide, a titanium halide, a boron halide and an alkyl boron halide.

2. An intermetallic compound in accordance with claim 1 wherein said transition metal is titanium or zirconium.

3. An intermetallic compound in accordance with claim 2 wherein said reducing metal is magnesium.

4. An intermetallic compound in accordance with claim 3 wherein said transition metal is titanium.

5. An intermetallic compound in accordance with claim 4 wherein said titanium and said magnesium are present in a molar ratio of from about 0.5:1 to 3:1.

6. An intermetallic compound in accordance with claim 5 wherein said reaction to form said product (A) is conducted in an enclosed reaction zone at elevated temperature under autogeneous pressure for a period of time sufficient to consume said magnesium metal; said partial hydrolysis provided by the presence of a controlled source of water, said water present in a concentration such that the molar ratio of said titanium to said water is in the range of between about 1:0.1 and 1:1.

7. An intermetallic compound in accordance with claim 6 wherein said water is provided by a member selected from the group consisting of a hydrated metal salt and an aquo complex.

8. An intermetallic compound in accordance with claim 7 wherein said water is provided by a hydrated metal salt.

9. An intermetallic compound in accordance with claim 8 wherein said hydrated metal salt is a hydrated magnesium salt.

10. An intermetallic compound in accordance with claim 5 wherein said titanium metal oxide is a tetraalkyl titanate.

11. An intermetallic compound in accordance with claim 10 wherein said tetraalkyl titanate is titanium tetra n-butoxide.

12. An intermetallic compound in accordance with claim 3 wherein said first halide activator is selected from the group consisting of an alkyl aluminum chloride, a silicon chloride, an alkyl silicon chloride, a titanium chloride, a boron chloride and an alkyl boron chloride.

13. An intermetallic compound in accordance with claim 12 wherein said first halide activator is selected from the group consisting of silicon tetrachloride and titanium tetrachloride.

14. An intermetallic compound in accordance with claim 13 wherein said first halide activator is silicon tetrachloride.

15. An intermetallic compound in accordance with claim 3 wherein said second halide activator is selected from the group consisting of an alkyl aluminum chloride, a silicon chloride, an alkyl silicon chloride, a titanium chloride, a boron chloride and an alkyl boron chloride.

16. An intermetallic compound in accordance with claim 15 wherein said second halide activator is selected from the group consisting of silicon tetrachloride and titanium tetrachloride.

17. An intermetallic compound in accordance with claim 16 wherein said second halide activator is titanium tetrachloride.

18. A catalyst system for the polymerization of alpha-olefins comprising
  (a) the intermetallic compound of claim 1 and
  (b) an organic compound which includes an element selected from the group consisting of aluminum and boron.

19. A catalyst system for the polymerization of alpha-olefins comprising:
  (a) the intermetallic compound of claim 3; and
  (b) an organoaluminum compound.

20. A catalyst system for the polymerization of ethylene copolymers comprising:
  (a) the intermetallic compound of claim 5; and
  (b) a trialkyl aluminum compound.

21. A catalyst system for the polymerization of ethylene and at least one higher alpha-olefin comprising:
  (a) the intermetallic compound of claim 7; and
  (b) triethyl aluminum.

* * * * *